United States Patent [19]
Simone

[11] Patent Number: 5,841,395
[45] Date of Patent: Nov. 24, 1998

[54] LOCALIZED INTERFERENCE NULLING PREPROCESSOR

[75] Inventor: Joseph D. Simone, Chelmsford, Mass.

[73] Assignee: Raytheon Corporation, Lexington, Mass.

[21] Appl. No.: 928,563

[22] Filed: Sep. 12, 1997

[51] Int. Cl.[6] .................................................. G01S 7/292
[52] U.S. Cl. ..................... 342/196; 342/373; 364/726.02
[58] Field of Search ................... 342/196, 157, 342/158, 159, 162, 373; 364/726.01, 726.02; 370/210; 702/77

[56] References Cited

U.S. PATENT DOCUMENTS

| | | | |
|---|---|---|---|
| 4,513,383 | 4/1985 | Hackett, Jr. .............................. | 364/517 |
| 4,931,977 | 6/1990 | Klemes ..................................... | 364/581 |
| 5,299,148 | 3/1994 | Gardner et al. .......................... | 364/574 |
| 5,610,612 | 3/1997 | Piper ....................................... | 342/195 |

*Primary Examiner*—John B. Sotomayor
*Attorney, Agent, or Firm*—Iandiorio & Teska

[57] ABSTRACT

A localized interference nulling preprocessor for a Fast Fourier Transform (FFT) or a Butler matrix system includes a means for forming a dot product of a signal vector and each of the preprocessed eigen vectors of the virtual interference covariance matrix of a predetermined localized interference, means for scaling the conjugate of the principal eigen vectors by the dot product, and means for subtracting from the signal vector the product of each dot product and conjugate of principal eigen vectors to generate a preprocess signal vector modified to produce a localized nulling of predetermined localized interference by a Fast Fourier Transform (FFT) or Butler matrix system.

4 Claims, 9 Drawing Sheets

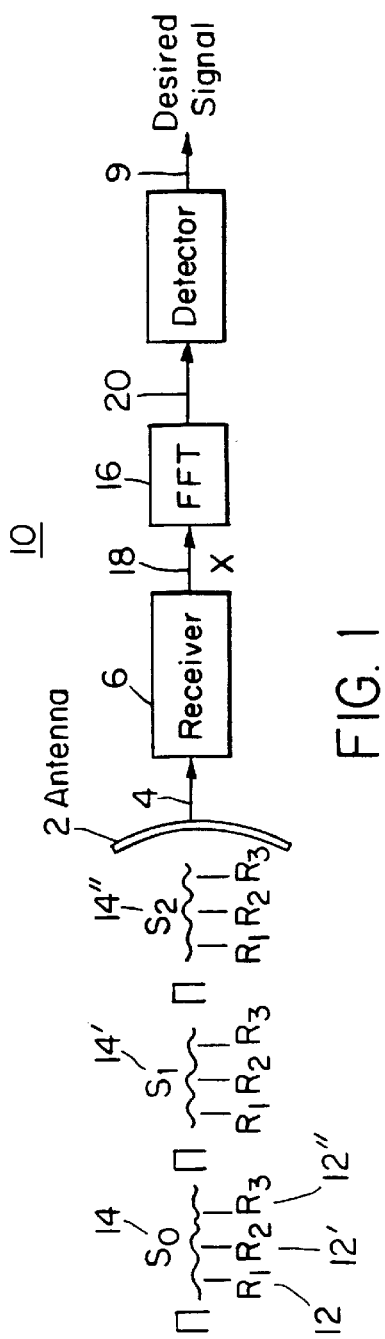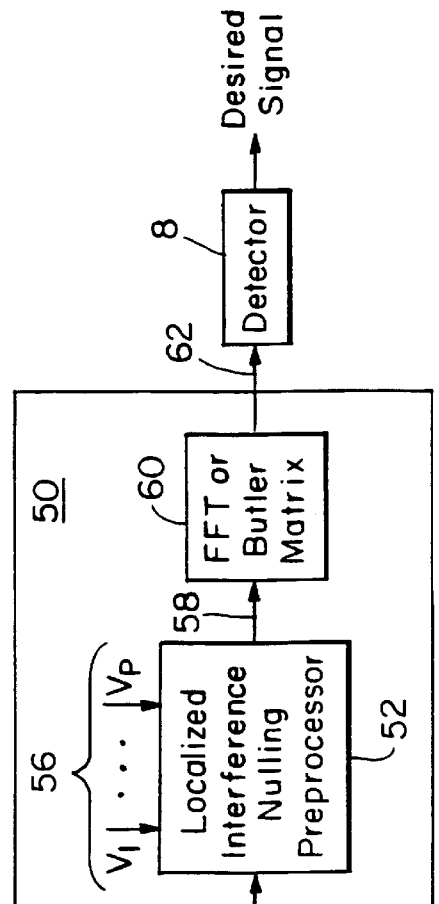

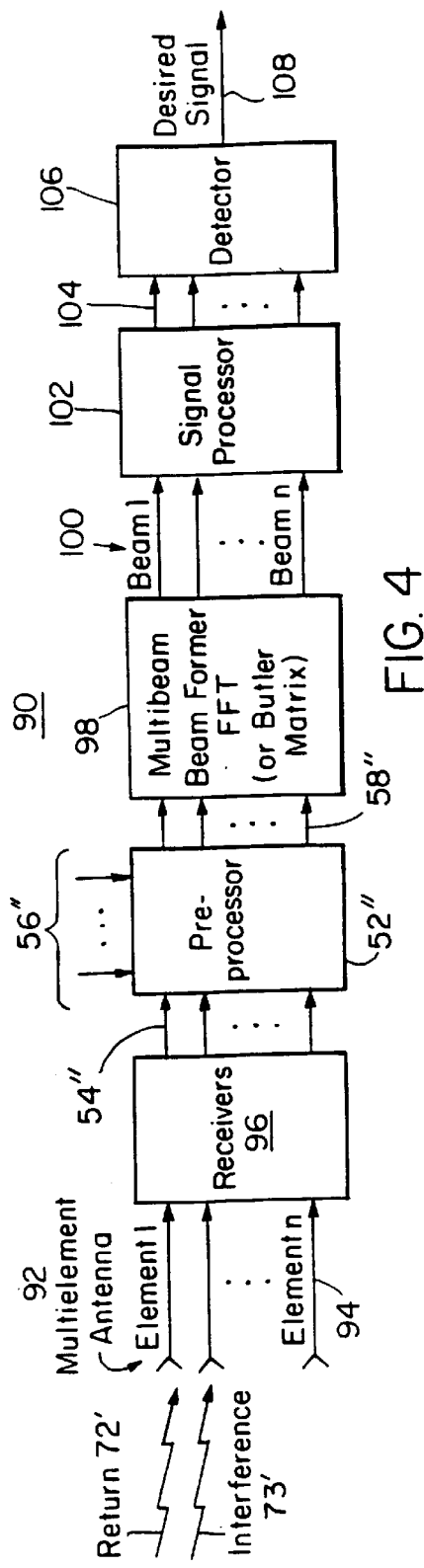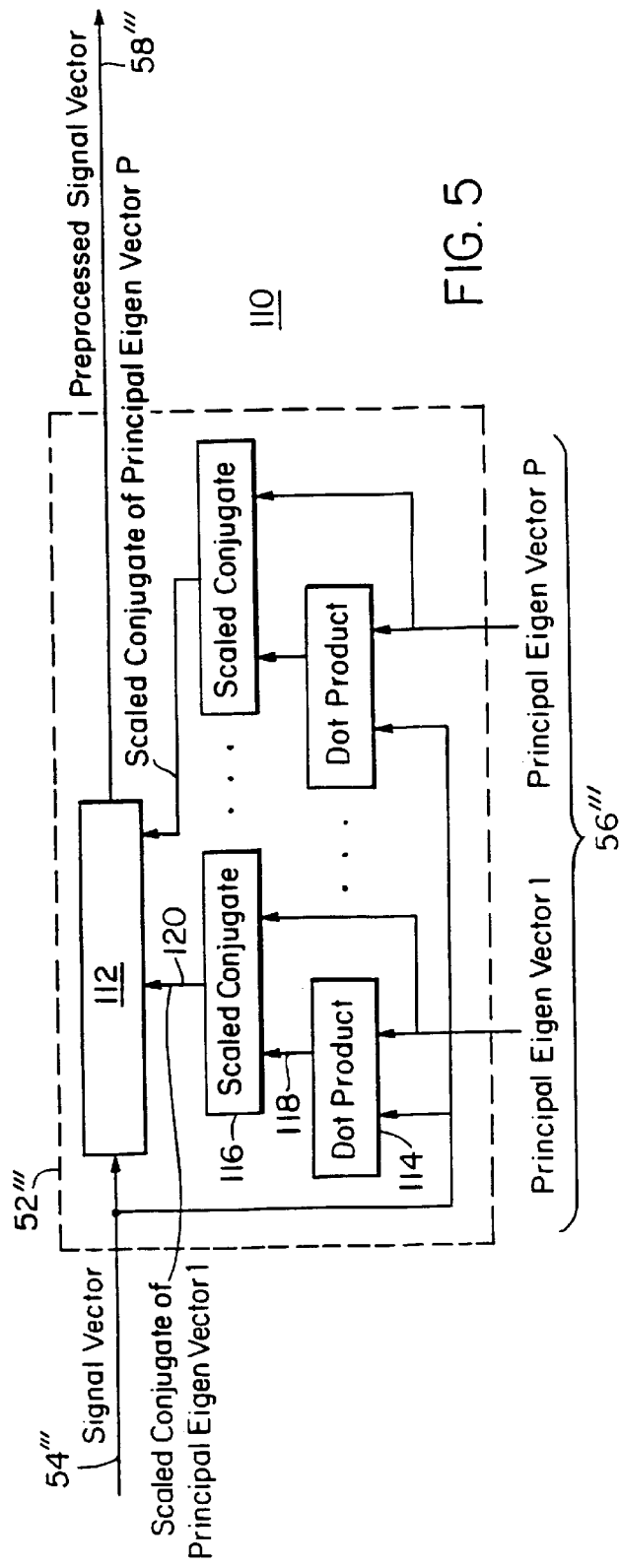

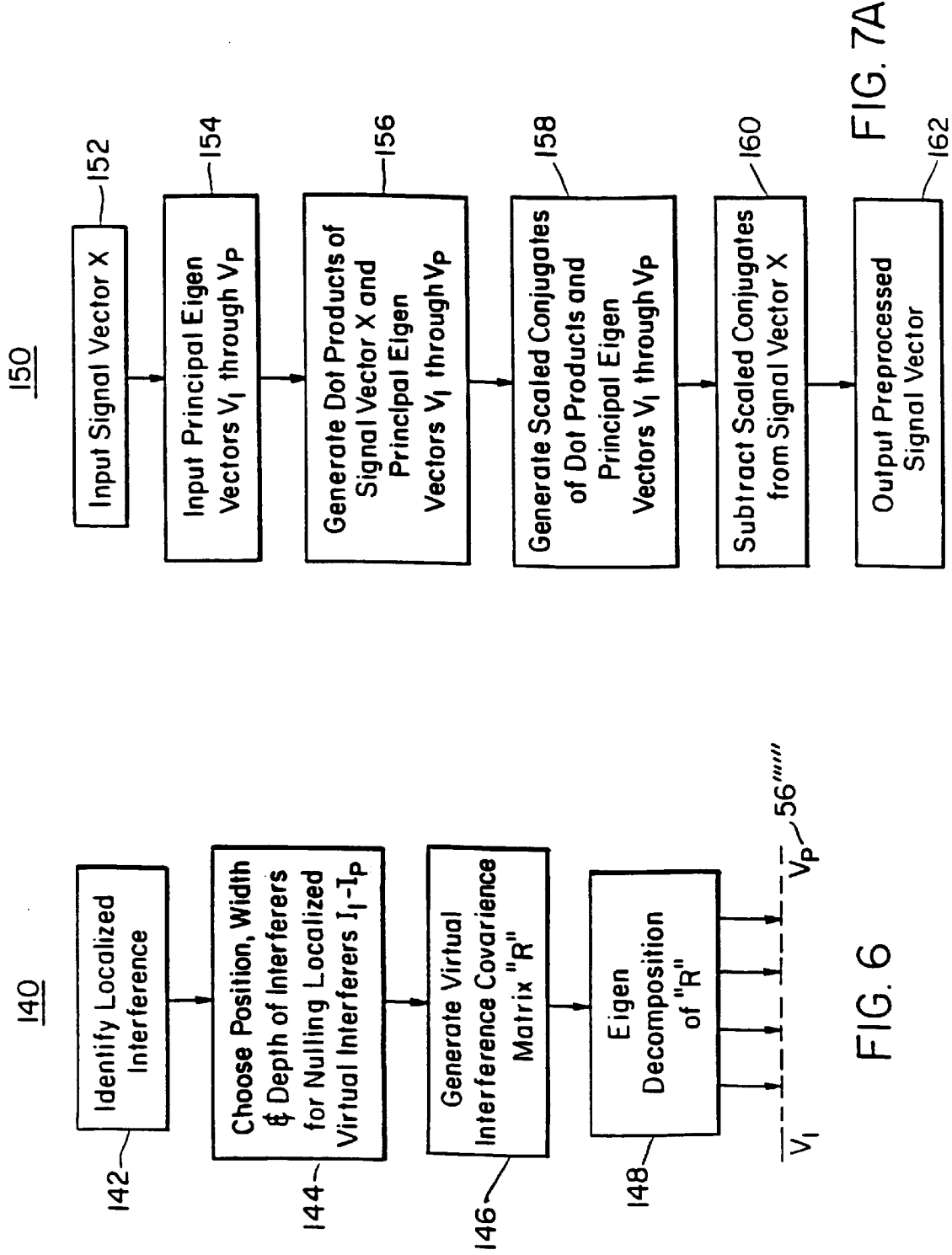

LOCALIZED INTERFERENCE NULLING PREPROCESSOR

FIELD OF INVENTION

This invention relates to a localized interference nulling preprocessor for a radar system requiring temporal or spatial spectrum analysis, and more particularly to a localized interference nulling preprocessor for a Doppler radar performing Fast Fourier Transform (FFT) processing or a multi-beam radar performing beam forming using a Butler Matrix or FFT.

BACKGROUND OF INVENTION

Doppler radar systems differentiate between fixed and moving targets by detecting a change in frequency of the reflected wave caused by Doppler effects. This reflected wave includes data corresponding to moving targets and any terrain or obstacles, for example, mountains, hills, buildings and trees. Looking at the data in the frequency domain, of a finite windowed temporal spectrum analysis, the filter matched to the target Doppler is a SINC($sinx/x$) function which has a main lobe at the target Doppler and multiple side lobes across Doppler. Data representing fixed objects in the terrain are called clutter returns. Clutter levels are large and near zero Doppler for ground radars and are large and at the velocity line for airborne radars (Main Beam Clutter). The problem with large clutter returns is that they leak into the target Doppler filter's side lobe response and obscure the detection of smaller amplitude targets.

One way to solve the problem of large clutter return side lobe leakage is to suppress the target Doppler filter's side lobe response 80 to 90 dB by using heavy window weighting. One of the disadvantages of this technique is that it results in a signal to noise ratio loss of as much as 3 dB requiring additional transmitter power to compensate for the loss.

Another method for reducing the effect of clutter on the target data is to use a Moving Target Indicator (MTI) filter. An MTI filter requires a settling time before valid target data can be used which wastes radar data. An MTI filter design with little settling time performs incomplete clutter cancellation and tends to also cancel slower moving targets. An MTI filter design with longer settling time has better clutter cancellation without the cancellation effects on slower moving targets but is more wasteful of radar data.

Another method for removing the effective clutter on the target data is to provide a filter bank with localized side lobe nulling at the frequency where the clutter is likely to occur. One method for implementing a localized nulling filter bank is to use a modified Discrete Fourier Transform (DFT) process where each filter's weights are customized to create a localized null near the clutter signal's doppler and a different filter peak response for each filter to cover the full target Doppler spectrum. The disadvantage of this method is that calculating the results of the modified DFT is a very large computational burden.

The above effects also occur in a multi-beam system which forms a spatial spectrum analysis. Here each beam formed with an FFT or butler matrix, consists of a SINC function with its peak in the desired look direction and side lobes elsewhere in space. Large clutter returns at low altitudes leak into the side lobes of the beams looking above the clutter and obscure low amplitude targets being received by these beams. This is important to a radar system which does not use Doppler processing to discriminate targets from clutter. Again, this can be solved with heavy beam weighting and its desirable loss or a modified DFT beamformer with localized nulling instead of the more efficient FFT or Butler matrix.

SUMMARY OF INVENTION

It is therefore an object of this invention to provide an improved localized interference nulling preprocessor for a Doppler radar system.

It is a further object of this invention to provide such a localized interference nulling preprocessor for a Fast Fourier Transform (FFT) system.

It is a further object of this invention to provide such a localized interference nulling preprocessor for a FFT or Butler matrix beam former.

It is a further object of this invention to provide such a localized interference nulling preprocessor which reduces the effect of large clutter or other interference returns and allows detection of smaller targets.

It is a further object of this invention to provide such a localized interference nulling preprocessor which reduces the effect of large clutter or other interference returns without significant target signal loss.

It is a further object of this invention to provide a localized interference nulling preprocessor which provides fixed position nulls for all filters or beams available with a Discrete Fourier Transform (DFT) but is computationaly more efficient.

It is a further object of this invention to provide such a localized interference nulling preprocessor which is computationaly more efficient than the conventional Fast Fourier Transform (FFT) approach using the full interference covariance matrix.

This invention results from the realization that a truly computationaly efficient Fast Fourier Transform (FFT) or Butler matrix system for nulling localized interference can be effected with the specificity of a Discrete Fourier Transform (DFT) technique but avoiding the computational burden of the Discrete Fourier Transform (DFT) approach and of an approach using a Fast Fourier Transform (FFT) and a full interference covariance matrix by forming the dot product of a signal vector and each of the predetermined principal Eigen vectors, representative of the location and characteristic of the interference to be nulled, of the virtual interference covariance matrix, scaling or multiplying the dot product and the conjugate of the principal eigen vectors and subtracting the result in each case from the signal vector to obtain a modified signal vector which will produce the targeted nulling of the localized interference by a subsequent Fast Fourier Transform (FFT) or Butler matrix.

This invention features a localized nulling preprocessor for a Fast Fourier Transform (FFT) system. There is a means for forming a dot product of a signal vector and each of the preprocessed eigen vectors of the virtual interference covariance matrix of a predetermined localized interference. There is a means for scaling a conjugate of the principal eigen vectors by the dot product. There is a means for subtracting the product of each dot product and conjugate of principal eigen vectors from the signal vector to generate a preprocessed signal vector which is modified to produce a localized nulling of predetermined localized interference by a Fast Fourier Transform (FFT) system.

In a preferred embodiment the means for scaling may include a multiplier means.

This invention features a localized nulling preprocessor for a Butler matrix system. There is a means for forming a dot product of a signal vector and each of the preprocessed eigen vectors of the virtual interference covariance matrix of a predetermined localized interference. There is a means for scaling a conjugate of the principal eigen vectors by the dot product. There is a means for subtracting the product of each dot product and conjugate of principal eigen vectors from the signal vector to generate a preprocessed signal vector which is modified to produce a localized nulling of predetermined localized interference by a Butler matrix system.

In a preferred embodiment the means for scaling may include a multiplier means.

BRIEF DESCRIPTION OF THE DRAWINGS

Other objects, features and advantages will occur to those skilled in the art from the following description of a preferred embodiment and the accompanying drawings, in which:

FIG. 1 is a block diagram of a radar processing system without the localized interference nulling preprocessor of this invention;

FIG. 2 is a block diagram of a radar processing system using the localized interference nulling preprocessor of this invention;

FIG. 4 is a block diagram of a spatial application of the localized interference nulling system of FIG. 2;

FIG. 5 is a logical flow diagram showing the localized interference nulling preprocessor of FIG. 2;

FIG. 6 is a flow chart showing the process for selecting a set of virtual interference nulls to be used with the localized interference nulling preprocessor of FIG. 2;

FIG. 7A is a flow chart showing the operation of the software which is installed on the microprocessor of FIG. 7 in order to implement the localized interference nulling preprocessor of FIG. 5;

DISCLOSURE OF THE PREFERRED EMBODIMENT

Figure 1A:
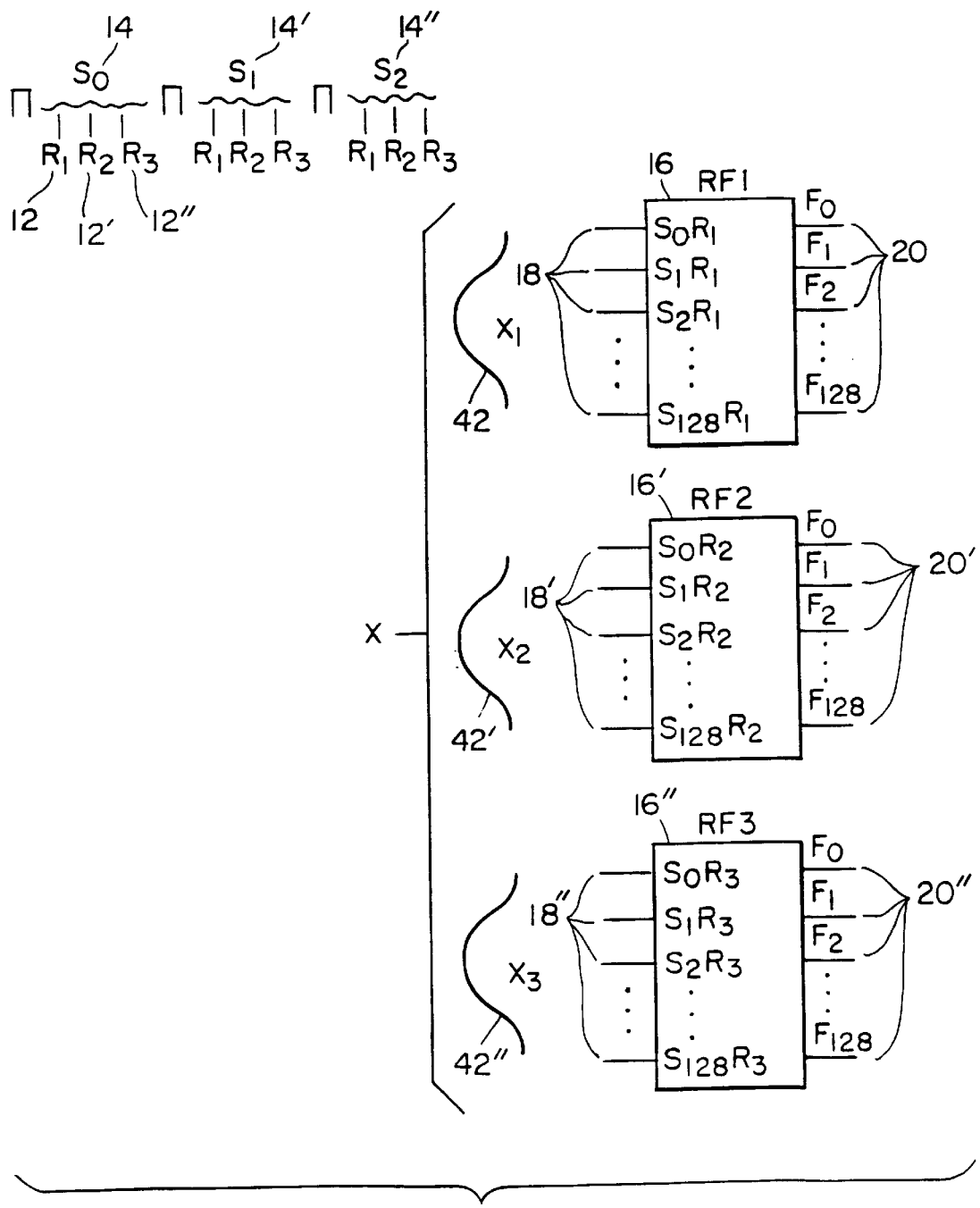
FIG. 1A is a more detailed view of the FFT of FIG. 1.

A basic radar system includes a radar transmitter which sends out a high frequency (usually RF) signal in the general direction of an area in which one wants to detect objects. This transmitted signal bounces off the objects and is reflected back from the objects as radar returns which contain information about the reflectivity, location and velocity of objects in the path of the transmitted signal. Objects can be detected by looking at the characteristics of the reflection of the signal after it bounces off the object. These objects include desired and undesired targets. Desired targets are the objects of interest and may include aircraft, missiles, and other vehicles. Undesired targets contain information which is not of interest and may include natural objects such as the ground, trees, mountains or atmospheric phenomena, or man-made objects such as buildings. Undesired target information is called clutter.

Information on both the undesired targets and the clutter is included in radar returns picked up by a radar receiver. Since the radar receiver itself cannot differentiate between desired targets and the clutter, a radar processor is required to filter out the clutter so that only the information of interest (the desired target information) remains. First the prior art methods for reducing the effective clutter will be discussed and then an improvement over those prior art methods will be presented.

There is shown in FIG. 1 a block diagram of a radar processing system 10 which accepts input from antenna 2, responsive to radar returns 12, 12' and 12", represented by range cells $R_1$, $R_2$ and $R_3$, in time sample 14, represented by $S_0$, which provide input 4 to receiver 6. Receiver 6 produces signal vector X which is input 18 to an FFT process 16. FFT 16 processes input 18 producing processed signal vector 20. Detector 8 responds to processed signal vector 20 to produce desired signal 9. The radar returns are reflections of the transmitted radar signal off objects in its path. In order to discriminate Doppler on the objects to be detected, radar returns called time samples are taken at uniformly spaced intervals. The number of time samples corresponds to the length N of the sequence of input samples which are represented by row vector X. In FIG. 1, the number of time samples chosen for this example is 128, but only three time samples 14, 14' and 14" are shown, represented by $S_0$, $S_1$, and $S_2$.

Radar returns within each time sample are represented by $R_1$, $R_2$ and $R_3$. Each time sample has the same number of radar returns in it. The number of radar returns within each time sample represents the number of range cells instrumented and may differ from the number of time samples. The radar returns provide input 18 to range FFT's 16 and 16' represented by $RF_1$ and $RF_2$ in FIG. 1A. The number of range FFT's corresponds to the number of range cells instrumented.

Each range FFT has a number of outputs $F_0$, $F_1$, $F_2$, ... $F_{128}$. Output 20 of a range FFT, represented by $F_0$, $F_1$, $F_2$, etc. are called Doppler filters. Each Doppler filter has its peak response at a different Doppler frequency. All Doppler filter outputs of a range FFT cover the entire Doppler spectrum a target can possess at a given range. All the Doppler filter outputs of all the range FFTs represent the entire Doppler spectrum a target can possess for all ranges instrumented. D. Curtis Schleher, *MTI and Pulsed Doppler Radar* (Artech House 1991) p. 74.

Figure 10:
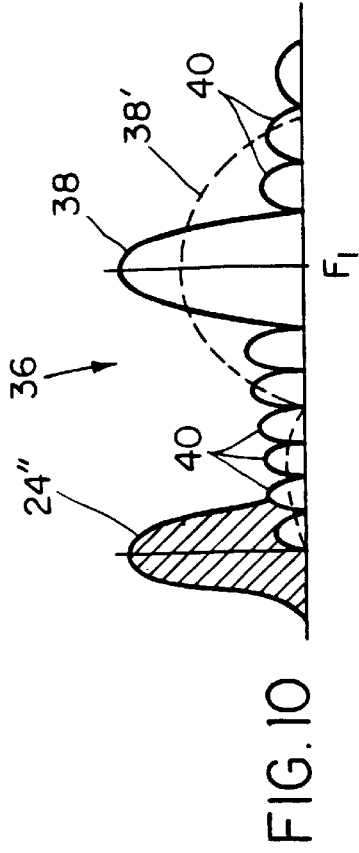
FIG. 10 is a frequency response plot showing the filter output of $F_3$ of FIG. 1.
Figure 10A:
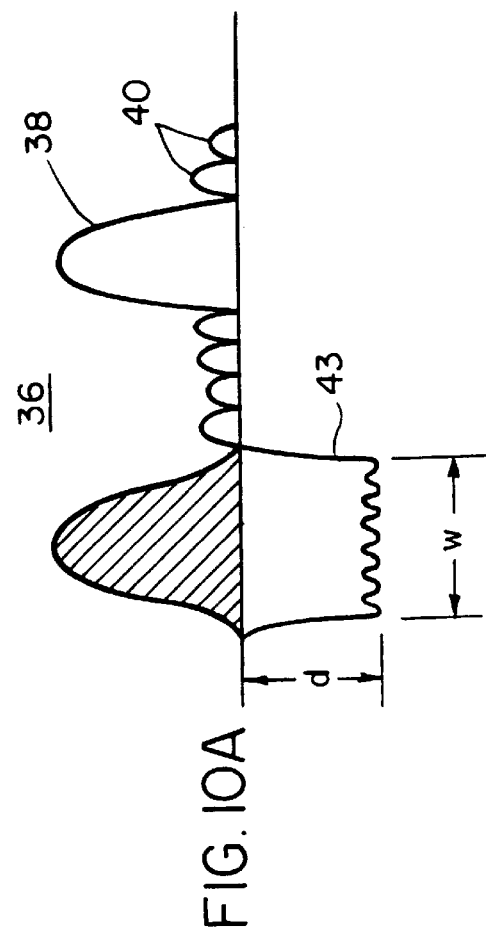
Figure 8:
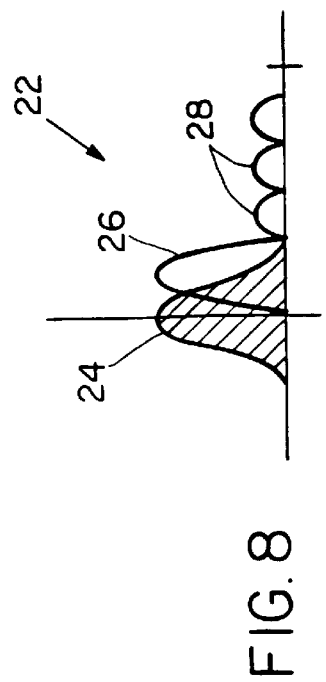
FIG. 8 is a frequency response plot showing the filter output of $F_1$ of FIG. 1.
Figure 9:
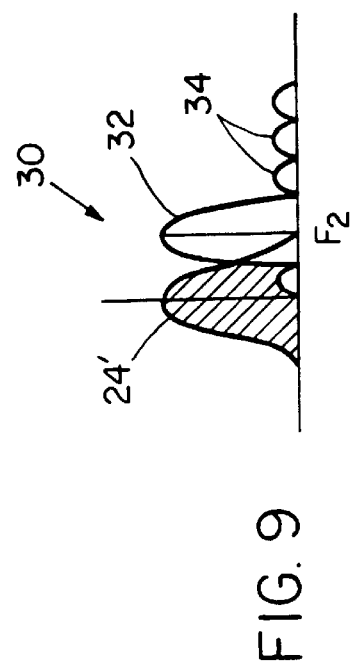
FIG. 9 is a frequency response plot showing the filter output of $F_2$ of FIG. 1.

The output of a Doppler filter for a unit input signal at different Doppler frequencies is referred to as its frequency response. Frequency response plot 22, FIG. 8, shows the response of Doppler filter $F_1$ of output 20. Peak 26 of Doppler filter $F_1$ occurs at normalized frequency $F_1$. Doppler filter $F_1$ also includes side lobes 28. Peak 24 at normalized frequency $F_0$ represents clutter signal. Since clutter is usually representative of an object which is not moving, the frequency response from the radar returns (reflections) from a radar transmitter signal bouncing off clutter is usually at a low frequency. Frequency response plot 30, FIG. 9, shows Doppler filter $F_2$ of output 20. Peak 24' at $F_0$ represents the clutter. Peak 32, represents the filter output at frequency $F_2$ and has side lobes 34. Frequency domain plot 36, FIGS. 10 and 10A, shows a typical Doppler filter $F_i$ of output 20 which has clutter 24" at $F_0$, a peak 38 at frequency $F_i$, and side lobes 40.

The frequency response of a typical Doppler filter $F_i$ exhibits its peak output for a unit input signal at the desired frequency $F_i$ and a low level response referred to as side lobes at other frequencies. Clutter is a very large signal at low frequency. A Doppler filter's response at these low frequencies with a large signal produces a large output which can obscure small target returns at Doppler frequencies at the peak of the response. This large output of a filter with the signal being at side lobe Doppler frequencies instead of the peak is called side lobe leakage.

One of the prior art techniques for reducing clutter side lobe leakage is to suppress side lobes of the Doppler filter by 80 to 90 dB by using heavy weighting 42, FIG. 1A. This has the effect of reducing a Doppler filters side lobes everywhere, although it is only needed about low Doppler frequencies. The problem with this technique is that the response of the filter becomes flatter and wider, as shown in phantom at 38' in frequency domain plot 36 and results in a 3 dB loss in signal to noise ratio. To compensate for the 3 dB loss, higher transmission power is required to bring the resulting signal back up to prior levels, as shown by filter response 38.

Another prior art method for reducing the effect of clutter on the target data is to use a Moving Target Indicator (MTI) filter. A MTI filter requires a settling time before valid target data can be used which wastes radar data. An MTI filter design with little settling time performs incomplete clutter cancellation and tends to also cancel slower moving targets. An MTI filter design with longer settling time has better clutter cancellation without the cancellation effects on slower moving targets but is more wasteful of radar data.

Another prior art method for removing the effect clutter on the target data is to provide a filter bank with localized side lobe nulling at the frequency where the clutter is likely to occur. One method for implementing a localized nulling filter bank is to use a modified Discrete Fourier Transform (DFT) process where each filter's weights are customized to create a localized null near the clutter signal's Doppler and a different filter peak response for each filter to cover the full target Doppler spectrum. The disadvantage of this method is that calculating the results of the modified DFT is a very large computational burden.

The basis for the proposed localized nulling approach is provided by antenna adaptive nulling theory. Monzingo Miller, *Introduction to Adaptive Arrays* (John Wiley & Sons 1980) p. 89–103. Antenna adaptive nulling theory is used for beamformers which are systems commonly used for detecting and isolating signals that are spatially propagating in a particular direction. A Doppler radar system is a temporal version of a beamformer. The optimum weight w to minimize interference of a beamformer output is given by the Wiener equation:

$$w = R^{-1} C_i \qquad (1)$$

where R is the N by N interference covariance matrix and $C_i$ is a column constraint vector defining direction for maximum gain. The interference covariance matrix R contains information which represent the interferences to be nulled.

In applying this to Doppler processing the column constraint vector $C_i$ would contain the Discrete Fourier Transform (DFT) coefficients for filter i. For example, $C_1$ would contain the Discrete Fourier Transform (DFT) coefficients for first range FFT 16, represented by $RF_1$. The Discrete Fourier Transform (DFT) coefficients $C_i$ are multiplied by the inverse interference covariance matrix $R^{-1}$ to produce an optimum weight column vector w. This optimum weight column vector w is applied to the row signal vector X of input data, yielding the complex scalar output of filter i:

$$F_i = X R^{-1} C_i \qquad (2)$$

The column constraint vectors $C_i$ are now concatenated to define an N by N matrix C where i ranges from 0 to N−1 in order to produce a row vector F containing the Discrete Fourier Transform (DFT) outputs:

$$F = X R^{-1} C \qquad (3)$$

Multiplying C by the $XR^{-1}$ row vector performs a Discrete Fourier Transform (DFT) with localized interference nulling. Matrix C could be factored to perform a Fast Fourier Transform (FFT). Rewriting equation (3) to express the multiplication by C as a Fast Fourier Transform (FFT) operator:

$$F = FFT(XR^{-1}) \qquad (4)$$

yields the desired results of placing fixed nulls in the Doppler spectrum for all filters. However, the process of multiplying $XR^{-1}$ requires $N^2$ operations and therefore computationaly is equivalent to the prior art Discrete Fourier Transform (DFT) computational load.

It should be noted that the covariance is not derived from the signal data X, but is calculated off line and contains synthesized interferers at positions in the Doppler spectrum where nulls are desired. Its generation and inversion (an order $N^3$ computational load) are not part of the on line process. It could also be generated from a model of the expected clutter spectrum.

Figure 2A:
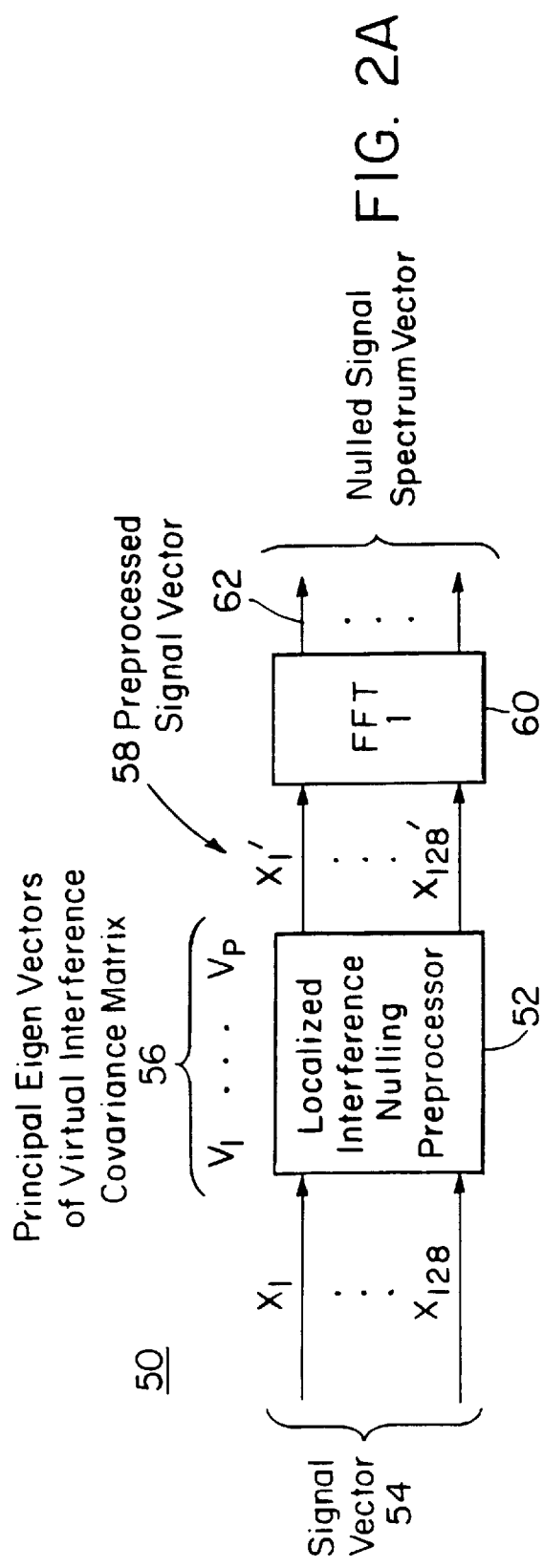
FIG. 2A is a more detailed block diagram of the localized interference nulling preprocessor of FIG. 2, showing only the preprocessor and the FFT.

A radar processing system 51, FIG. 2, which employs localized interference nulling system 50 of this invention, accepts input 4 from antenna 2 which is sent to receiver 6, producing input signal vector 54. Localized interference nulling system 50 includes localized interference nulling preprocessor 52 responsive to signal vector 54, represented by X, and principal eigen vectors of virtual interference covariance matrix 56, represented by $V_1$, through $V_P$, to produce preprocessed signal vector 58. Fast Fourier Transform (FFT) 60 responds to preprocessed signal vector 58, producing nulled signal spectrum vector 62.

Localized interference nulling preprocessor 52 allows the covariance data product described in equation (4) to be performed with a reduced computational load. The to covariance matrix R can be expressed in eigen form:

$$R = V \lambda V^H \qquad (5)$$

where $\lambda$ is a diagonal matrix of eigen values of R, V is an N by N matrix containing the Eigen vectors of R and $V^H$ is an N by N matrix containing the conjugates transpose of V. Covariance matrix R can be expressed in matrix notation as follows:

$$R = \begin{bmatrix} r_{11} & r_{12} & \ldots & r_{1N} \\ r_{21} & r_{22} & \ldots & r_{2N} \\ \cdot & \cdot & & \cdot \\ \cdot & \cdot & & \cdot \\ \cdot & \cdot & & \cdot \\ r_{N1} & r_{N2} & \ldots & r_{NN} \end{bmatrix} \quad (6)$$

The inversion of the covariance matrix $R^{-1}$ can also be expressed in eigen form:

$$R^{-1} = V\lambda^{-1}V^H \quad (7)$$

The inverse of R, $R^{-1}$ can be written in another form where n is the noise eigen value and $V_k$ are the individual eigen vectors and I is an identity matrix:

$$R^{-1} = \sum_{k=1}^{N} V_k \lambda^{-1} V_k^H = \frac{1}{n}\left(I - \sum_{k=1}^{N} \frac{\lambda_k - n}{\lambda_k} V_k V_k^H\right) \quad (8)$$

Alfonso Farina, *Antenna Based Signal Processing Techniques for Radar Systems* (Artech House 1992) p. 245.

The interference Eigen values are much larger than the noise eigen values n and the noise Eigen values are equal to each other. Therefore, $R^{-1}$ can be written in terms of its principal eigen vectors (Eigen vectors with large Eigen values):

$$R^{-1} = I - \sum_{k=1}^{P} \eta_k V_k V_k^H = I - \eta_1 V_1 V_1^H - \eta_2 V_2 V_2^H \ldots - \eta_P V_P V_P^H \quad (9)$$

Where the 1/n term is dropped since it represents a simple scale factor and P represents the number of principal eigen vectors. Equation (8) is substituted into the Fast Fourier Transform (FFT) expression of equation (4) yielding the equation used by localized interference nulling preprocessor 52 which provides 2NP operations, in contrast to the $N^2$ operations required for the calculation of equation (4). The result of this substitution is:

$$F = FFT(X - \eta_1(XV_1)V_1^H - \eta_2(XV_2)V_2^H \ldots - \eta_P(XV_P)V_P^H) \quad (10)$$

Note that $(XV_i)$ is a dot product and can be represented by the equivalent sum of products:

$$X = X - \eta_1 V_1^* \sum_{i=1}^{N} x_i v_{1i} - \eta_2 V_2^* \sum_{i=1}^{N} x_i v_2 i - \ldots \eta_P V_P^* \sum_{i=1}^{N} x_i v_{Pi} \quad (11)$$

Equation (10) represents the final form of the function used by localized interference nulling preprocessor 52 according to this invention. η is a number equal to or less than 1 and defines the null depth. The value of $\eta_i = 1$ is typically the value used which yields the full null depth. The total computational load of preprocess equation (10) combined with a Fast Fourier Transform (FFT) operation is much less of a computational burden than a weighted Discrete Fourier Transform (DFT).

Figure 3:
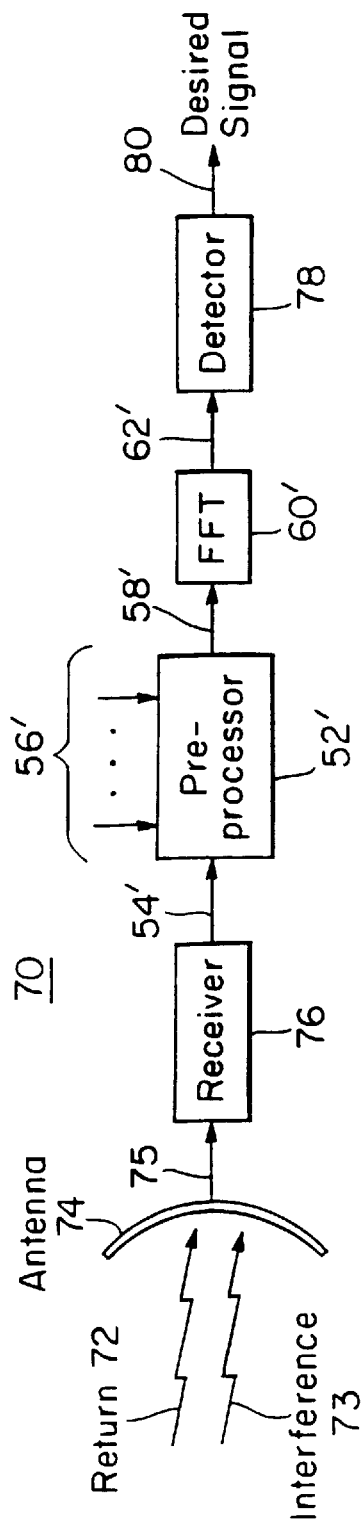
FIG. 3 is a block diagram of a temporal application of the localized interference nulling system of FIG. 2.

Typically, the localized interference nulling preprocessor of this invention may be used in a temporal application 70, FIG. 3, in which return signals 72 and interference 73 from antenna 74 provide input 75 to receiver 76. These signals may include pulse, continuous wave (cw) and modulated cw radar signals. The antenna may be bistatic or monostatic. Receiver 76 responds to antenna input 75, producing signal vector 54'. Preprocessor 52 responds to signal vector 54' and principal Eigen vectors $V_1$ through $V_P$, thereby producing preprocessed signal vector 58'. Fast Fourier Transform (FFT) 60' receives preprocessed signal vector 58', and produces nulled signal spectrum vector 62'. Detector 78 receives nulled signal spectrum vector 62', producing desired signal 80.

In another application, the localized interference nulling preprocessor of this invention may be used for a spatial application 90, FIG. 4, in which radar returns 72' and interference 73' provide the input to multi-element antenna 92 having 1 through N elements 94 which provide the input to receivers 96. The radar returns may be from a pulse radar or continuous wave (cw) and modulated cw radar. The radar may be bistatic or monostatic. Preprocessor 52" responds to signal vector 54" at the output of receivers 96, and principal eigen vectors of virtual interference covariance matrix 56" in order to produce preprocessed signal vector 58". Multi-beam former 98, which may be a Fast Fourier Transform (FFT) or a Butler matrix responds to preprocessed signal vector 58" producing multi-beam output 100 with a localized null common to all beams. Signal processor 102 responds to multi-beam output 100, providing output 104 to detector 106 which produces desired signal 140.

Logical flow diagram 110, FIG. 5, of a preferred embodiment of localized interference nulling preprocessor 52''', includes subtractor circuit 112 responsive to signal vector 54''' and scaled conjugate 120 for each of principal eigen vectors of the virtual interference covariance matrix 56'''. A scaled conjugate circuit 116 generates scaled conjugate principal eigen vectors 120 in response to output 118 of dot product circuit 114 and principal eigen vectors 56'''. Dot product circuit 114 and scaled conjugate circuit 116 respond to each of 1 through P principal eigen vectors 56'''. Subtractor circuit 112 subtracts each of scaled conjugates of principal eigen vectors 120, from signal vector 54''', thereby producing preprocessed signal vector 58'''.

Figure 5A:
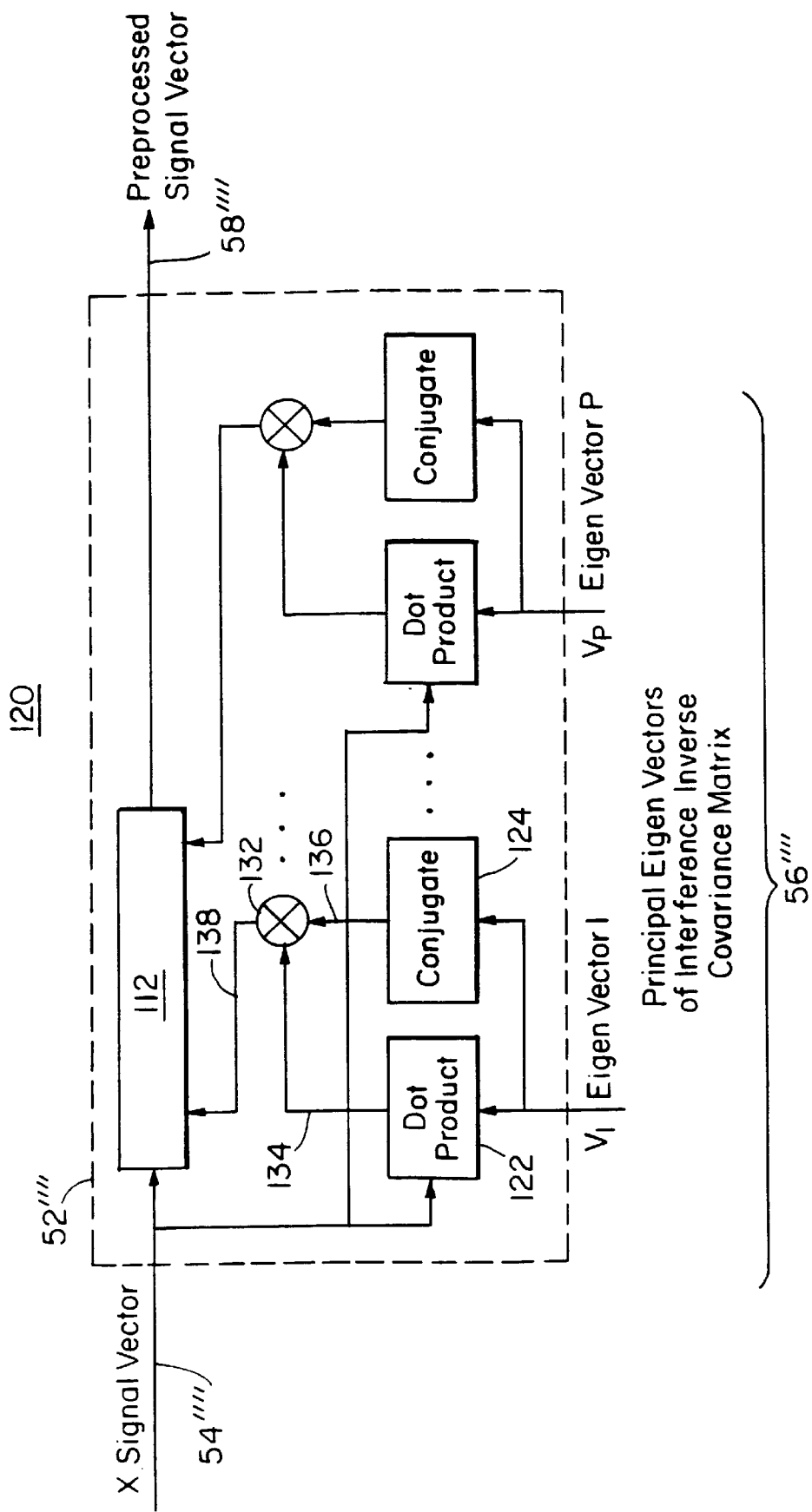
FIG. 5A is a more detailed logical flow diagram showing the use of multipliers in the localized interference nulling preprocessor of FIG. 2.

More detailed logical flow diagram 120, FIG. 5A, of localized interference nulling processor 52"" includes multiplier circuit 132. Preprocessor 52"" responds to signal vector X, 54"", and principal eigen vectors of virtual interference covariance matrix $V_1$ through $V_P$, 56"", to produce preprocessed signal vector 58"". This includes dot product circuits 122 which respond to signal vector 54"" and each of principal eigen vectors 56"" to produce dot product output 134. Also included are conjugate circuit 124 of each of the principal eigen vectors 56"". Multiplier circuit 132 responds to output 134 of dot product circuit 122 and output 136 of conjugate circuit 124 to produce multiplied output 138. Subtracting circuit 112 subtracts multiplied output 138 for each of principal eigen vectors $V_1$ through $V_P$ 56"" from signal vector X 54"" to produce preprocessed signal vector 58"".

Figure 5B:
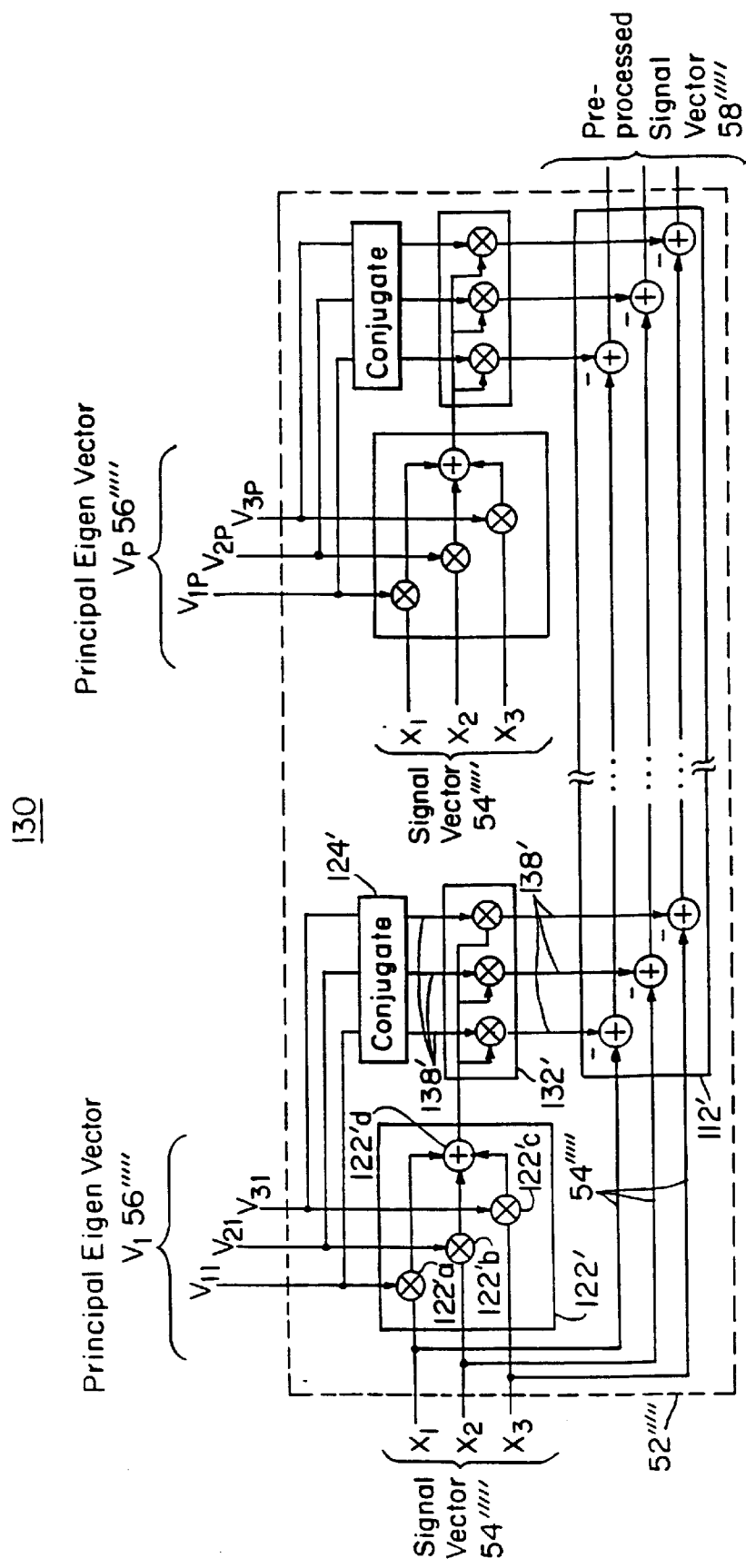
FIG. 5B is a schematic diagram of the localized interference nulling preprocessor of FIG. 5A implemented in hardware.

The preprocessor 52"" of FIG. 5A may be implemented using the hardware shown in schematic diagram 130, FIG. 5B. Hardware implementation 52"" includes dot product circuit 122', conjugate circuit 124, multiplier circuit 132' and subtractor circuit 112'. Dot product circuit 122' includes adder 122'd, and multipliers 122'a, 122'b, and 122'c.

Figure 7:
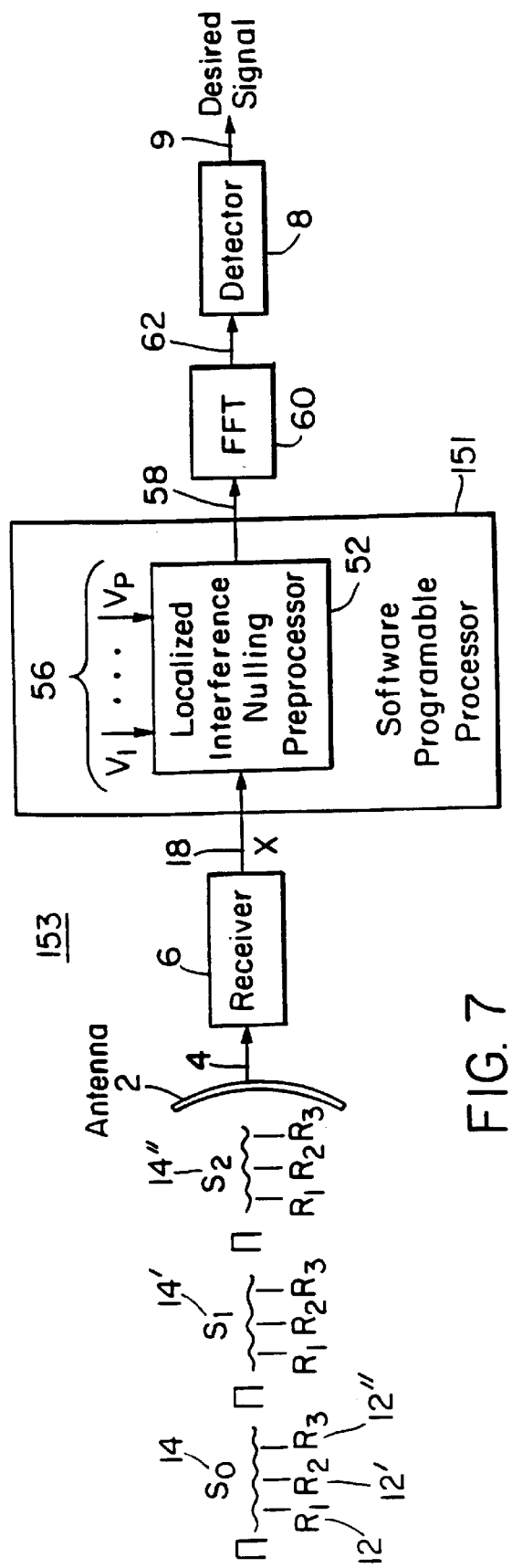
FIG. 7 is a block diagram of the localized interference nulling system of FIG. 2 implemented in software.

Preprocessor 52"" of FIG. 5 may be implemented in radar processing system 153, FIG. 7. Antenna 2 receives radar input 2 which is sent to receiver 6 which produces input signal vector 18. A software or microcoded-programmable processor or multiple processors, programmed according to flow chart 150, FIG. 7A, responds to input signal vector 18 and principal Eigen vectors of virtual interference covariance matrix 56 to produce preprocessed signal vector 58. FFT 60 responds to preprocessed signal vector 58, producing nulled signal spectrum vector 62, which is then received by detector 8, producing desired signal 9.

Flow chart 150, FIG. 7A, describes the operation of the programmable processor 151. Signal vector X is input, step 152, and principal Eigen vectors $V_1$ through $V_P$ are input, step 154. Dot products are generated from the signal vector X and principal Eigen vectors, step 156, and then scaled conjugates of dot products and principal Eigen vectors are generated, step 158. Scaled conjugates are then subtracted from signal vector X, step 160, and preprocessed signal vector is output, step 162.

The principal Eigen vectors $V_1$ through $V_P$, 56, used by the localized interference nulling preprocessor 52 is determined by a process shown by flow chart 140, FIG. 6. The first step 142, is to identify the localized interference which is characterized by the width, position and depth of the desired null 43, FIG. 10A. This is an iterative process. First, a beginning and ending frequency corresponding to the width of the anticipated clutter is selected. Virtual Interferers $I_1$ and $I_P$ are introduced at the beginning and ending frequencies respectively. Each of these interferers introduces a sharp narrow null at those frequencies. This determines the width of the null. In order to make the null deep enough throughout the width of the null's range, more interferers are added as necessary to achieve the desired null width and the desired depth.

Virtual Interferer $I_1$ is a column vector containing a number of elements $i_{1,1}$ through $i_{1,N}$ which are associated with each of the 1 through N time samples chosen. For example, if there are 128 time samples, then N=128 and $I_1$ will include 128 elements $i_{1,1}$ through $i_{1,128}$.

Each element i may be represented, as $Ae^{j\theta}$ where $j=\sqrt{-1}$. A typical virtual interferer vector $I_r$ has N elements $i_{rs}$ where s=0, 1, ... N−1 and values $i_{rs}=Ae^{-j2\pi sR/N}$ where R is a number between 0 and N−1 and defines the normalized frequency position of the virtual interferer. A is a constant; typically a value of 1000 is used.

After choosing the position, width and depth of the interferers, the virtual interference covariance matrix R, 146, is generated by adding the outer product $I_i \times I_i^H$ of each vector $I_i$ and its conjugate transpose $I_i^H$, plus a virtual noise covariance matrix represented as a diagonal matrix with constant values along the diagonal and zeros elsewhere. The amplitudes of the interferers are chosen to be much larger (1000:1) than the noise the virtual noise covariance insures the total covariance is not mathematically "ill conditioned" and is invertible.

From the virtual interference covariance matrix R, the eigen decomposition of R, 148 is determined. The P Eigen vectors associated with the p largest Eigen values are vectors $V_1$ through $V_P$. The preprocessed principal Eigen vectors $V_1$ through $V_P$ taken together define the selected null.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A localized interference nulling preprocessor for a Fast Fourier Transform (FFT) system, comprising:

means for forming the dot product of the signal vector and each of the preprocessed eigen vectors of the virtual interference covariance matrix of a predetermined localized interference;

means for scaling the conjugate of said principal eigen vectors by said dot product; and means for subtracting from the signal vector the product of each said dot product and conjugate of said principal eigen vectors to generate a preprocessed signal vector modified to produce a localized nulling of said predetermined localized interference by a Fast Fourier Transform (FFT) system.

2. The localized interference nulling preprocessor for a Fast Fourier Transform (FFT) system wherein said means for scaling includes multiplier means.

3. A localized interference nulling preprocessor for a Butler matrix system, comprising:

means for forming the dot product of the signal vector and each of the preprocessed eigen vectors of the virtual interference covariance matrix of a predetermined localized interference;

means for scaling the conjugate of said principal eigen vectors by said dot product; and means for subtracting from the signal vector the product of each said dot product and conjugate of said principal eigen vectors to generate a preprocessed signal vector modified to produce a localized nulling of said predetermined localized interference by a Butler matrix system.

4. The localized interference nulling preprocessor for a Butler matrix system wherein said means for scaling includes multiplier means.

* * * * *